(No Model.) 3 Sheets—Sheet 1.
J. T. McHENRY.
CORN HARVESTER.
No. 382,100. Patented May 1, 1888.
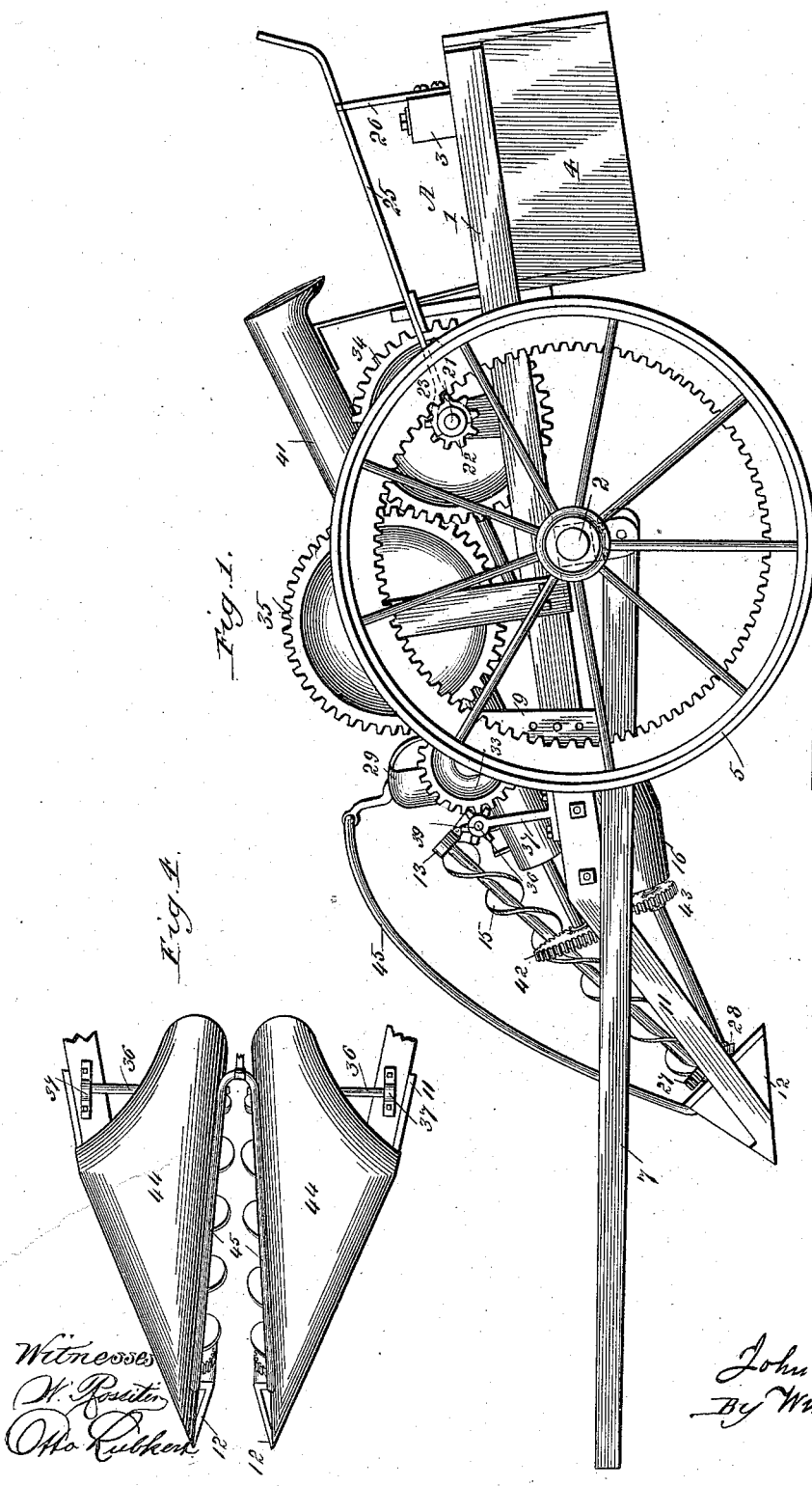

(No Model.)
3 Sheets—Sheet 2.
J. T. McHENRY.
CORN HARVESTER.
No. 382,100.   Patented May 1, 1888.
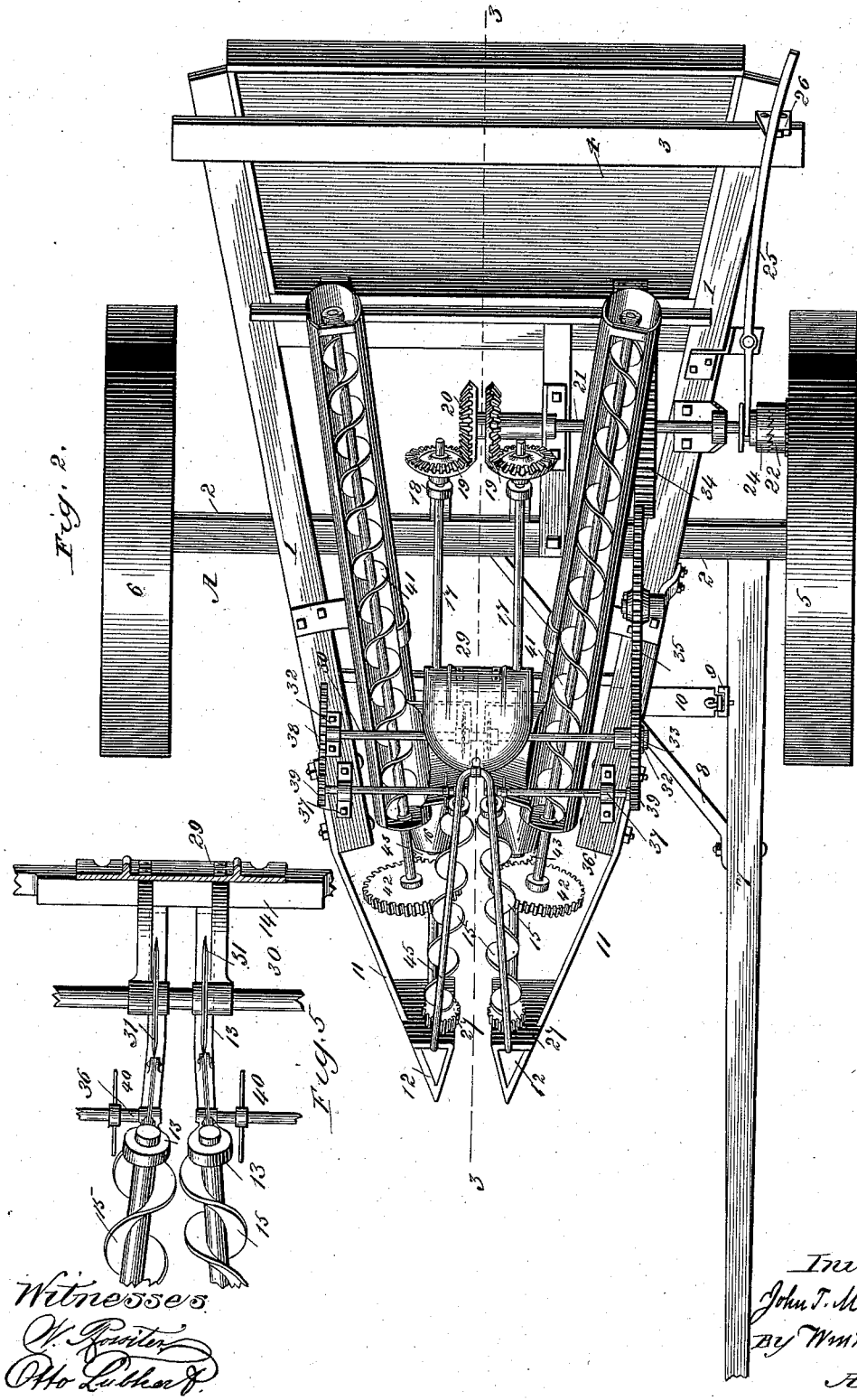

(No Model.) 3 Sheets—Sheet 3.
J. T. McHENRY.
CORN HARVESTER.
No. 382,100. Patented May 1, 1888.
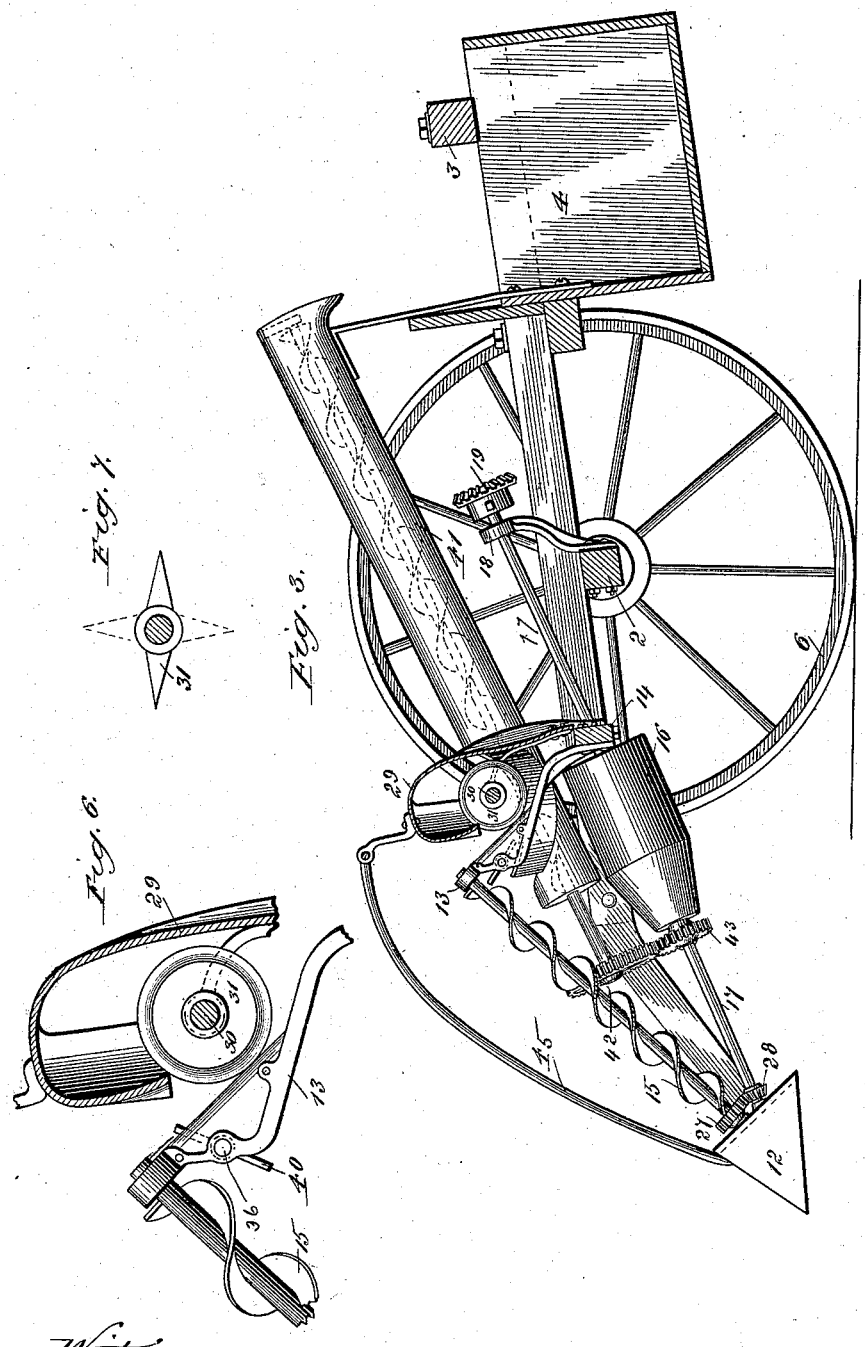
Witnesses
W. Rossiter
Otto Lubkert
Inventor:
John T. McHenry.
By Wm. H. Rotz.
Atty.

UNITED STATES PATENT OFFICE.

JOHN T. McHENRY, OF CHICAGO, ILLINOIS.

CORN-HARVESTER.

SPECIFICATION forming part of Letters Patent No. 382,100, dated May 1, 1888.

Application filed October 28, 1887. Serial No. 253,658. (No model.)

*To all whom it may concern:*

Be it known that I, JOHN T. MCHENRY, a citizen of the United States of America, residing at Chicago, in the county of Cook and State of Illinois, have invented certain new and useful Improvements in Corn-Harvesters, of which the following is a specification, reference being had therein to the accompanying drawings.

This invention has for its object to provide a corn-harvester that with being pulled through the field will take in a row of stalks and will separate and gather therefrom the ears of corn, leaving the stalks on the field in a broken-down condition; and with that object in view my invention consists of the novel devices and combinations of devices hereinafter described and specifically claimed.

In the accompanying drawings, Figure 1 represents a side elevation of the entire machine; Fig. 2, a plan view of the same, and Fig. 3 a longitudinal vertical section on line 3 3 in Fig. 2. Figs. 4, 5, and 6 are detached sectional views of the forward part of the machine, and Fig. 7 shows a modified shape of the ear-separating knives.

Corresponding referential characters in the several figures of the drawings designate like parts.

A denotes the main frame of the machine, composed of two beams, 1, secured in a V shape upon axle 2 and connected by rear cross-beam, 3, below which the receptacle 4 is secured between beams 1. Upon the ends of axle 2 are journaled the traction-wheels 5 and 6, and under one end of the axle 2 is pivotally secured, between suitable eye-lugs, the tongue 7, a side brace, 8, of which is pivoted under the center of such axle 2. This tongue has secured to it a standard-plate, 9, perforated with a series of bolt-holes for adjustably securing it by a pin or bolt to the eyed end of a cross-bar, 10, fixed under the forward portion of frame A. Against the forward ends of beams 1 of frame A are secured bars 11, forming a continuation of such beams 1, with a downward inclination. To the end of each bar 11 is formed a triangular shoe, 12, both such shoes 12 standing apart a sufficient distance for receiving the cornstalks between them as the machine is pulled along. Between these shoes 12 and brackets 13, secured upon a cross-bar, 14, of frame A, are pivoted two spiral conveyers, 15, which toward the rear will approach each other, forming two jaws, so that a cornstalk entering will be crowded between these conveyers 15, which by their movement will draw such stalk rearward. Below the rear ends of conveyers 15 are pivoted two rollers, 16, cylindrical in rear and conical in front, so as to take in between them the cornstalk drawn rearward by the conveyers 15 and to pull it downward. The shafts 17, upon which the rollers 16 are mounted, are pivoted with their forward ends into shoes 12 and are journaled at their rear ends in brackets 18, secured to the axle 2, and upon the rearward overhanging ends of these shafts 17 are mounted bevel-pinions 19, meshing with bevel-wheels 20, mounted upon a transverse shaft, 21, that is journaled into suitable brackets above and behind the axle 2, with a pinion, 22, loosely sleeved upon the other end of said shaft 21, which pinion 22 meshes with the internal gear 23 of traction-wheel 5, and is coupled to rotate with the shaft 21 by a shifting-clutch, 24, the coupling-teeth of which are moved into or out of contact with pinion 22 by a forked lever, 25, locked in either position by a bracket, 26. Each spiral conveyer 15 has mounted upon its forward end a pinion, 27, meshing with a pinion, 28, mounted upon shafts 17, whereby motion is transmitted to such conveyers. To cross-bar 14 is also secured a frame, 29, forming a shield or guard under which are mounted upon a shaft, 30, two circular knives, 31, the cutting-edges of which move close against the rearwardly-inclined ridges of brackets 13. The shaft 30 is journaled in standard-bearings 32, secured upon frame A, and has mounted upon it a pinion, 33, driven from shaft 21 by a gear-wheel, 34, mounted thereon, and by an intermediate gear-wheel, 35, pivoted to a standard-bracket.

Two shafts, 36, are journaled in brackets 37 forward of and parallel with shaft 30, each driven from such shaft 30 by gear-wheels and pinions 33, 38, and 39, mounted upon the ends of the respective shafts, and each shaft 36 has mounted a radially-armed hub, 40.

A cornstalk being drawn rearward by conveyers 15 and then downward by rollers 16, the corn-ears extending from the stalks, in a more or less angular position thereto, will be moved with their stems downward upon the inclined ridge of brackets 13, and into contact with the cutting-edges of rotary knives 31, to be severed from the stalks, when at the same time the arms of hub 40 will push the ears downward into the inclined spout of one of the boxes of spiral conveyers 41, which conveys the ears rearward and dumps them into the receptacle 4 of frame A. The stalk is guided between the two conveyers 15 and two brackets 13, and cannot come in contact with the knives, while the ears standing at an angle to the stalk are seized by the arms of hub 40 and drawn down under the knives. The stalk is not severed at all.

The shield 29 serves to protect the knives, but has no effect upon the action of the machine in stripping the ear from the stalk.

Each conveyer 41 has mounted upon its forwardly-projecting gudgeon a gear-wheel, 42, meshing with a pinion, 43, mounted upon shaft 17.

Guard-rails 45 are secured over conveyers 15 that will assist in guiding the cornstalks into the machine. The forward conveyers, 15, and bars 11, with shoes 12, may be covered with metal shields 44, as shown by Fig. 4.

The knives 31, instead of being circular, may be radial knife-plates secured to a suitable hub, as shown in Fig. 7.

The principal elements of my machine are screw conveyers 15 for engaging the cornstalk and pulling it rearward, the rollers 16 for pulling the stalk downward, the knives 31 for severing the ears from the stalks, the radially-armed hubs 40 for pushing the ear downward, and the conveyers 41 for carrying the ears into the receptacle, while the devices herein shown for transmitting motion to the several parts may be varied in many ways, and therefore I do not desire to be restricted to the particular construction and arrangement of parts herein shown and described.

What I claim is—

1. In a corn-harvester, the combination of a pair of screw conveyers forming the jaws of the harvester, a pair of rollers located beneath and to the rear of the said conveyers, and rotating knives located longitudinally to the rear of the conveyers and vertically between the conveyers and the rollers, as set forth.

2. In a corn-harvester, the combination of conveyers forming the jaws for receiving and drawing the stalks into the machine, and rollers beneath and to the rear of the conveyers for pulling the stalks vertically downward, with rotary cutters at the end of the conveyers for severing the ears from the stalks, and with rotating radial arms in front and to the side of the knives for feeding the ears downward as they are severed from the stalks, as set forth.

3. In a corn-harvester, the combination of conveyers forming the jaws for receiving and drawing the stalks into the machine, rollers beneath and to the rear of the conveyers for pulling the stalks vertically downward, rotary cutters at the rear end of the conveyers for severing the ears from the stalks, conveyers extending rearwardly from the knives for carrying the ears to the rear of the machine, and rotary hubs having radial arms for feeding the ears from the cutters to the conveyers, all as set forth.

In testimony whereof I affix my signature in presence of two witnesses.

JOHN T. McHENRY.

Witnesses:
WILLIAM H. LOTZ,
OTTO LUBKERT.